(12) United States Patent
Ichinose et al.

(10) Patent No.: US 10,814,482 B2
(45) Date of Patent: Oct. 27, 2020

(54) ROBOT CONTROLLER

(71) Applicant: FANUC CORPORATION, Yamanashi (JP)

(72) Inventors: Masakazu Ichinose, Yamanashi (JP); Takahiro Okamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 163 days.

(21) Appl. No.: 16/220,594

(22) Filed: Dec. 14, 2018

(65) Prior Publication Data

US 2019/0217469 A1    Jul. 18, 2019

(30) Foreign Application Priority Data

Jan. 18, 2018  (JP) .................................. 2018-006671

(51) Int. Cl.
*B25J 9/16* (2006.01)
*G05B 19/416* (2006.01)
(Continued)

(52) U.S. Cl.
CPC ........... *B25J 9/1651* (2013.01); *B25J 9/1656* (2013.01); *B25J 13/088* (2013.01); *G05B 19/416* (2013.01);
(Continued)

(58) Field of Classification Search
CPC ...... B25J 9/1651; B25J 13/088; B25J 9/1656; B25J 13/00; B25J 19/0091; G05B 19/416;
(Continued)

(56) References Cited

U.S. PATENT DOCUMENTS 7,591,078 B2 *  9/2009  Crampton .............. G01B 11/03
                                                        33/503
9,821,458 B1    11/2017  Watts
(Continued)

FOREIGN PATENT DOCUMENTS

CN        106914895           7/2017
CN        107160396           9/2017
(Continued)

OTHER PUBLICATIONS

Office Action dated Jun. 24, 2020 in German Patent Application No. 10 2019 200 117.3.
(Continued)

*Primary Examiner* — Jason Holloway
(74) *Attorney, Agent, or Firm* — Wenderoth, Lind & Ponack, L.L.P.

(57) ABSTRACT

A robot controller controls an arm tip end portion of a robot to move at constant predetermined speed on the basis of a movement path including an arc portion, the robot controller including: a centrifugal force calculation unit that calculates a centrifugal force acting on the arm tip end portion as time series data; a transformation unit that performs Fourier transformation with respect to the time series data of the centrifugal force into frequency data; and a speed determination unit that determines the predetermined speed such that a frequency component in a predetermined range including a natural vibration frequency of the robot is equal to or less than a threshold on the basis of frequency data of the centrifugal force.

4 Claims, 6 Drawing Sheets

(51) Int. Cl.
*B25J 13/08* (2006.01)
*B25J 13/00* (2006.01)
*B25J 19/00* (2006.01)

(52) U.S. Cl.
CPC ............ *B25J 13/00* (2013.01); *B25J 19/0091* (2013.01); *G05B 2219/39187* (2013.01); *G05B 2219/39195* (2013.01); *G05B 2219/39231* (2013.01); *G05B 2219/39241* (2013.01); *G05B 2219/39266* (2013.01); *G05B 2219/43066* (2013.01)

(58) Field of Classification Search
CPC ........... G05B 2219/39266; G05B 2219/39195; G05B 2219/39241; G05B 2219/39187; G05B 2219/39231; G05B 2219/43066
See application file for complete search history.

(56) References Cited

U.S. PATENT DOCUMENTS

| | | | | |
|---|---|---|---|---|
| 2007/0046677 | A1* | 3/2007 | Hong | G05B 19/41 345/442 |
| 2007/0073502 | A1* | 3/2007 | Umeda | G01P 21/00 702/96 |
| 2007/0288124 | A1* | 12/2007 | Nagata | B25J 9/1694 700/258 |
| 2013/0061695 | A1* | 3/2013 | Sato | B25J 19/02 73/865 |
| 2015/0258685 | A1* | 9/2015 | Matsumoto | B25J 9/1641 700/261 |
| 2018/0207798 | A1* | 7/2018 | Tsuzaki | B25J 13/088 |

FOREIGN PATENT DOCUMENTS

| | | |
|---|---|---|
| DE | 26 56 433 | 6/1978 |
| DE | 20 2008 012 487 | 2/2010 |
| DE | 11 2013 003 209 | 4/2015 |
| DE | 10 2012 017 328 | 8/2016 |
| JP | 6-250723 | 9/1994 |
| JP | 7-261853 | 10/1995 |
| JP | 8-202426 | 8/1996 |
| JP | 9-204216 | 8/1997 |
| JP | 11-24720 | 1/1999 |
| JP | 2007-272597 | 10/2007 |
| JP | 2016-78149 | 5/2016 |
| JP | 2017-56544 | 3/2017 |

OTHER PUBLICATIONS

Office Action dated Jul. 28, 2020 in Chinese Patent Application No. 201910027027.2.

\* cited by examiner

ROBOT CONTROLLER

This application is based on and claims the benefit of priority from Japanese Patent Application No. 2018-006671, filed on 18 Jan. 2018, the content of which is incorporated herein by reference.

BACKGROUND OF THE INVENTION

Field of the Invention

The present invention relates to a robot controller.

Related Art

Patent Documents 1 to 3 disclose technologies of suppressing vibration of an arm excited by resonance at a natural vibration frequency (natural resonance frequency) of a robot, in an industrial robot. Patent Document 1 discloses a technology of suppressing vibration of an arm by providing a notch filter a control loop, and removing a frequency component corresponding to a natural frequency of a robot from a control signal. Patent Document 2 discloses a technology of suppressing vibration of an arm at the time of operation start or stop (at the time of acceleration and deceleration) of a robot by performing Fourier transformation with respect to an acceleration indicated in an acceleration pattern to obtain a power spectrum distribution, removing a portion corresponding to a frequency that excites vibration in a robot from the power spectrum distribution, and performing inverse Fourier transformation with respect to the remaining power spectrum distribution to obtain an acceleration pattern again. Patent Document 3 discloses a technology of suppressing vibration of an arm in real time (at the time of acceleration and deceleration) by calculating a natural frequency of a robot from a spring constant of each articulation and an inertial moment of an arm from timepoint to timepoint, and setting acceleration time and deceleration time of an acceleration and deceleration pattern to integral multiple of an inverse number of the natural frequency.

Patent Document 1: Japanese Unexamined Patent Application, Publication No. H07-261853
Patent Document 2: Japanese Unexamined Patent Application, Publication No. H06-250723
Patent Document 3: Japanese Unexamined Patent Application, Publication No. 2007-272597
Patent Document 4: Japanese Unexamined Patent Application, Publication No. 2017-056544
Patent Document 5: Japanese Unexamined Patent Application, Publication No. H11-024720

SUMMARY OF THE INVENTION

For example, in a robot that performs sealing processing, control is required, the control being for tracing a complicated path accurately at high speed, while maintaining the speed of an arm tip end portion of the robot to be constant. In such control, when a robot passes a curved portion (arc route) of a path, centrifugal force acts on the arm tip end portion. Then, due to this centrifugal force, vibration is excited in the arm tip end portion after the robot passes the curved portion (arc route) in some cases, and path accuracy of the arm tip end portion is degraded in some cases.

In regard to this point, Patent Documents 4 and 5 disclose technologies of suppressing vibration of an arm excited by a centrifugal force acting on the arm when a robot passes a curved portion (arc route) of a path. For example, Patent Document 5 discloses a technology of suppressing vibration of an arm tip end portion due to a centrifugal force in an arc route by setting the maximum allowance speed according to a range of a radius of the arc route to the speed of a robot on the basis of table data in which the maximum allowance speed is predetermined for each range of the radius of the arc route. Note that, in the technology disclosed in Patent Document 5, only the speed in the vicinity of the arc route is changed.

As described above, for example, in a robot, that performs sealing processing, it is necessary that the speed of an arm tip end portion of the robot is maintained to be constant such that a sealant is evenly applied. In control of such a robot, in order to maintain predetermined path accuracy, a determination method of the maximum speed is required, the method realizing a cycle time as short as possible, while suppressing vibration excited by a centrifugal force.

An object of the present invention is to provide a robot controller that achieves both suppression of vibration in a robot and increasing of speed of the robot.

(1) A robot controller (for example, a robot controller 20 described later) according to the present invention controls an arm tip end portion (for example, an arm tip end portion 12 described later) of a robot (for example, a robot 10 described later) to move at constant predetermined speed on the basis of a movement path including an arc portion, the robot controller including: a centrifugal force calculation unit (for example, a centrifugal force calculation unit 22 described later) that calculates a centrifugal force acting on the arm tip end portion as time series data; a transformation unit (for example, a Fourier transformation unit 23 described later) that performs Fourier transformation with respect to the time series data of the centrifugal force into frequency data; and a speed determination unit (for example, a speed determination unit 24 described later) that determines the predetermined speed such that a frequency component in a predetermined range including a natural vibration frequency of the robot is equal to or less than a threshold on the basis of the frequency data of the centrifugal force.

(2) In the robot controller described in (1), the threshold may be an upper limit value of the frequency component in the predetermined range including the natural vibration frequency of the robot, for satisfying a movement path accuracy of the arm tip end portion with desired path accuracy.

(3) In the robot controller described in (1) or (2), the predetermined range including the natural vibration frequency of the robot may be a variation range of the natural vibration frequency that varies according to a posture of the robot.

(4) In the robot controller described in any of (1) to (3), the centrifugal force calculation unit may calculate the centrifugal force on the basis of speed, acceleration, or angular speed of the arm tip end portion, a mass of the arm tip end portion, and a curvature radius of the arc portion of the movement path.

According to the present invention, a robot controller that achieves both suppression of vibration in a robot and increasing of speed of the robot can be provided.

DETAILED DESCRIPTION OF THE INVENTION

Figure 1:
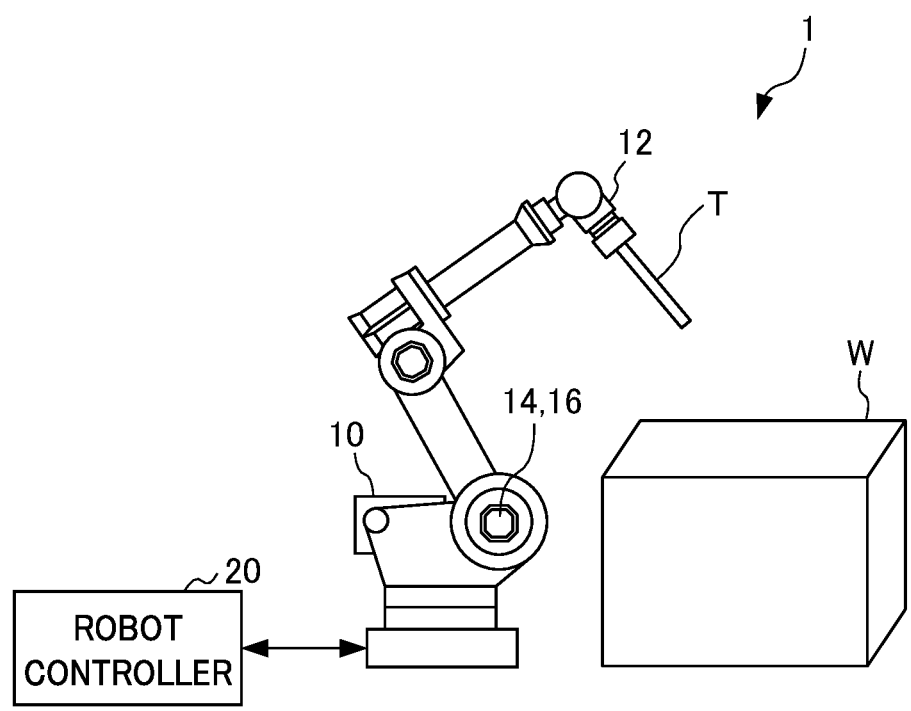
FIG. 1 is a diagram showing a configuration of a robot system according to an embodiment.

An example of an embodiment of the present invention will be described below with reference to attached drawings. Note that, the same or corresponding portions are added with the same reference numeral in each drawing.

(Robot System)

FIG. 1 is a diagram showing a configuration of a robot system according to the present embodiment. A robot system 1 shown in FIG. 1 moves a tool (sealant application unit) T and a workpiece W relatively by using a robot 10 to apply sealing processing on the workpiece W by using the tool T. The robot system 1 shown in FIG. 1 includes the robot 10, the tool (sealant application unit) T, and the robot controller 20.

The robot 10 is an articulated type robot such as a six-axis vertical articulated type robot or a four-axis vertical articulated type robot. The tool T is attached to an arm tip end portion 12 of the robot 10. The robot 10 includes a plurality of servo motors 14 incorporated therein and driving each of a plurality of drive axes (in FIG. 1, only one servo motor is shown for the purpose of convenience). The servo motor 14 is driven and controlled by the robot controller 20, and position and posture of the robot 10 and the tool T are controlled by the drive and control of the servo motor 14.

The tool T has a head for applying a sealant to the workpiece W. The tool T performs sealing processing with respect to the workpiece W by the control of the robot controller 20.

An encoder 16 is provided in each servo motor 14. The encoder 16 detects rotation angle and rotation speed around an axis of the servo motor 14 to detect position and move speed of the arm tip end portion 12 of the robot 10, that is, position and move speed of the tool T. The detected position and move speed are utilized as position feedback and speed feedback.

The robot controller 20 stores an operation program, teaching data, or the like for operation control of the robot 10. The teaching data includes path data indicating position and posture of the robot 10 and the tool T at the time of performing sealing processing on the workpiece W in a path of an arc, a straight line path, a combination thereof, or the like. The teaching data is input by an operator via a teaching operator's panel (not shown), for example. The robot controller 20 calculates an operation program for the operation control of the robot 10 on the basis of the teaching data. The robot controller 20 performs the operation control of the robot 10 on the basis of path data based on the operation program, a speed command (constant speed), and the position feedback and the speed feedback from the encoder 16, to control the position and posture of the robot 10 and the position and posture of the tool T and to control the relative positions of the tool T and the workpiece W. The robot controller 20 will be described in detail below.

(Robot Controller)

Figure 2:
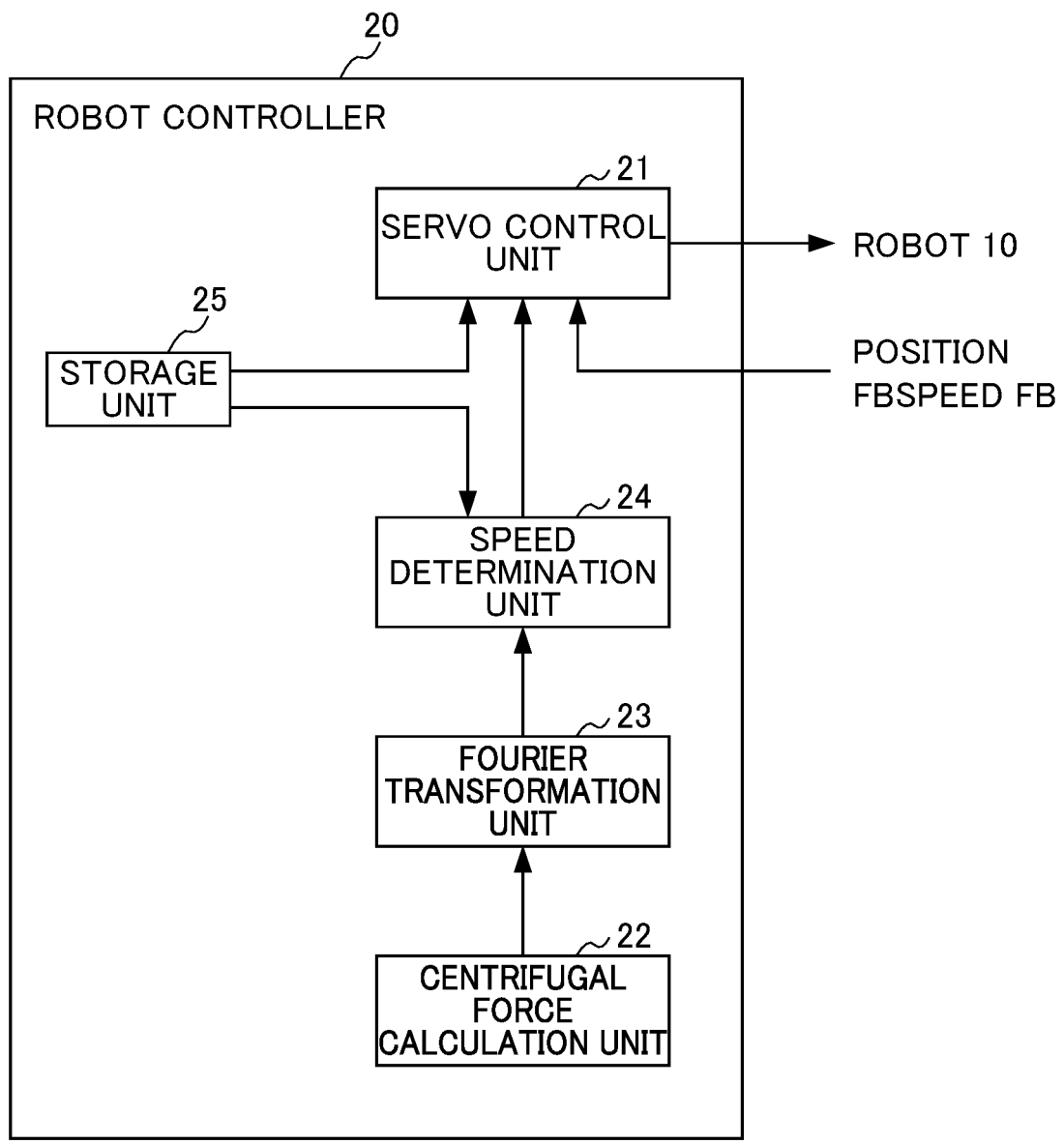
FIG. 2 is a diagram showing a configuration of a robot controller according to the embodiment.

FIG. 2 is a diagram showing a configuration of the robot controller 20 according to the present embodiment. The robot controller 20 shown in FIG. 2 includes a servo control unit 21, a centrifugal force calculation unit 22, a Fourier transformation unit 23, a speed determination unit 24, and a storage unit 25.

The servo control unit 21 generates a drive current for driving and controlling the servo motor 14 of the robot 10 such that the robot 10 moves in the movement path at constant speed, on the basis of the movement path based on the operation program stored in the storage unit 25, the speed command (constant speed), and the position feedback (position FB) and speed feedback (speed FB) from the encoder 16, to perform the operation control of the robot 10. In this way, the servo control unit 21 controls the arm tip end portion 12 of the robot 10 to move at constant speed such that the sealant is evenly applied in the sealing processing.

Figure 3:
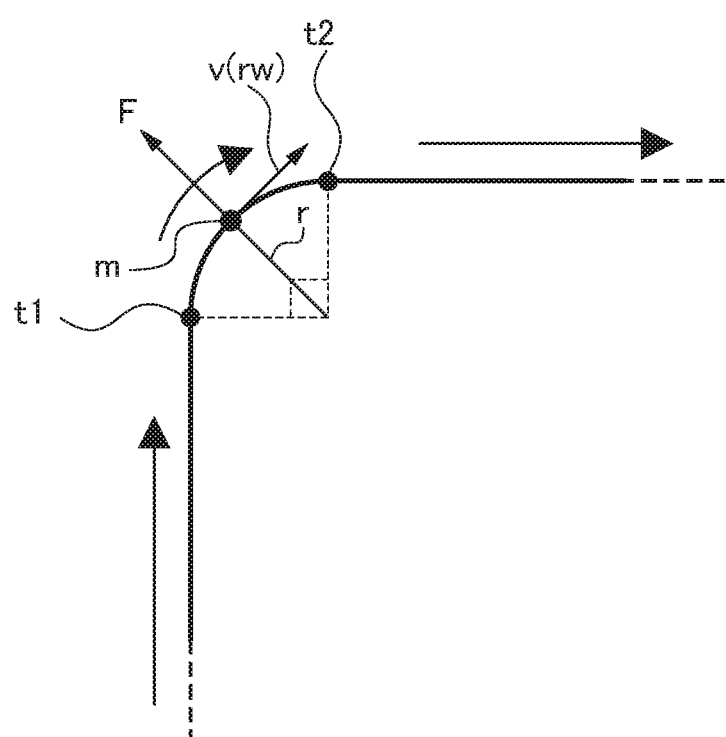
FIG. 3 is a schematic diagram showing an example of a movement path (path data) of an arm tip end portion of a robot.

FIG. 3 is a schematic diagram showing an example of a movement path (path data) of the arm tip end portion 12 of the robot 10. In FIG. 3, in order to facilitate understanding of the feature of the present embodiment, a simple movement path formed by a straight line, an arc, and a straight line is assumed. In an arc portion of this movement path, a centrifugal force F in a direction perpendicular to a travelling direction of the robot 10 acts on the arm tip end portion 12 of the robot 10. Then, due to this centrifugal force F, vibration is excited in the arm tip end portion 12 of the robot 10 after the robot 10 passes the arc portion.

Figure 4A:
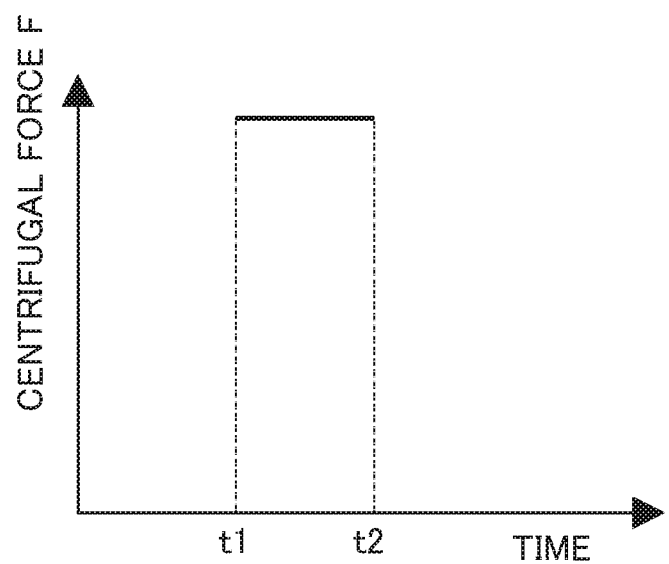
FIG. 4A is a schematic diagram showing time series data of a centrifugal force generated in the movement path shown in FIG. 3.

As shown in FIG. 4A, the centrifugal force calculation unit 22 calculates the centrifugal force F acting on the arm tip end portion 12 of the robot 10 as time series data. FIG. 4A is a schematic diagram showing the time series data of the centrifugal force F generated in the movement path shown in FIG. 3. In FIG. 4A, the centrifugal force F is generated in time t1 to t2 corresponding to the arc portion of the movement path shown in FIG. 3.

For example, as shown in FIG. 3, the centrifugal force calculation unit 22 considers the arm tip end portion 12 of the robot 10 (hereinafter, the arm tip end portion also means the tool T provided in the arm tip end portion) as a mass point, and calculates the centrifugal force F as time series data on the basis of the following formula (1) (the second term) based on mass m and move speed v of the arm tip end portion 12 (tool T) of the robot 10, and a curvature radius r of the arc portion of the movement path.

$$F = mv^2/r = m\omega r = ma \quad (1)$$

The centrifugal force F is proportional to the curvature $1/r$ and the speed v that vary from time point to time point. When the curvature $1/r$ varies from time point to time point, the curvature radius r may be the minimum value. The move speed v may be a speed command value, or may be an actual measured value when the robot 10 is operated in advance on the basis of the operation program. The actual measured value may be the speed feedback (speed FB) from the encoder 16, or may be a detection value of a speed sensor (not shown) provided in the arm tip end portion 12 (tool T) of the robot 10. The curvature radius r of the arc portion of the movement path may be obtained from the movement path (path data).

Note that, the centrifugal force calculation unit 22 may use, instead of the move speed v of the arm tip end portion 12 (tool T) of the robot 10, angular speed ω (the third term in the formula (1)), or acceleration a (the fourth term in the formula (1)). The angular velocity ω may be an actual measured value when the robot 10 is operated in advance on the basis of the operation program, measured by using an angular speed sensor provided in the arm tip end portion 12 (tool T) of the robot 10, for example. The acceleration a may be an actual measured value when the robot 10 is operated in advance on the basis of the operation program, measured by using an acceleration sensor provided in the arm tip end portion 12 (tool T) of the robot 10, for example.

Figure 4B:
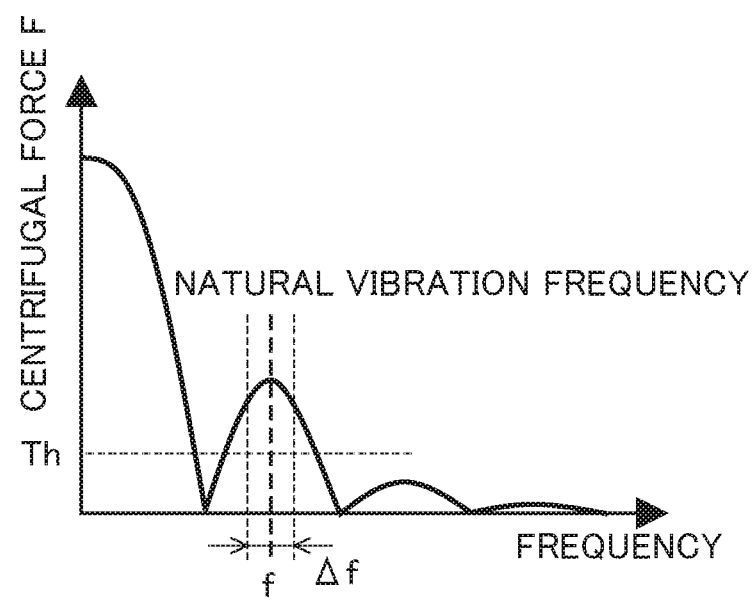
FIG. 4B is a schematic diagram showing a power spectrum distribution obtained by performing Fourier transformation with respect to the time series data of the centrifugal force shown in FIG. 4A.

As shown in FIG. 4B, the Fourier transformation unit 23 performs Fourier transformation with respect to the time series data of the centrifugal force F obtained by calculation by the centrifugal force calculation unit 22, to obtain a power spectrum distribution (frequency data). FIG. 4B is a schematic diagram showing the power spectrum distribution obtained by performing Fourier transformation with respect to the time series data of the centrifugal force F shown in FIG. 4A. As a power of a frequency component corresponding to a predetermined range Δf (for example, 10 Hz to 15 Hz) including a natural vibration frequency f of the robot 10 is larger, vibration is easier to be generated in the arm tip end portion 12 (tool T) of the robot 10 after the robot 10 passes the arc portion. The predetermined range Δf including the natural vibration frequency f is a variation range of the natural vibration frequency that varies according to the posture of the robot 10.

Figure 5A:
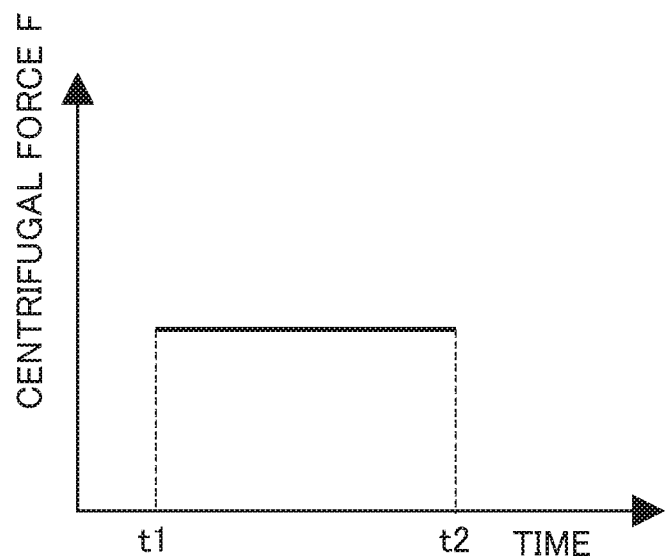
FIG. 5A is a schematic diagram showing the time series data of a centrifugal force F after speed change (decrease).
Figure 5B:
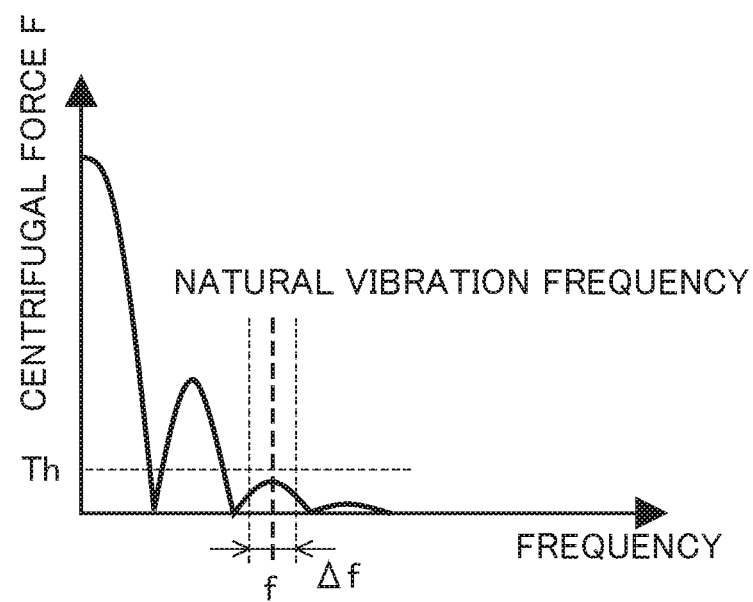
FIG. 5B is a schematic diagram showing the power spectrum distribution of the centrifugal force F after the speed change (decrease).

As shown in FIG. 5A and FIG. 5B, the speed determination unit 24 determines and changes (decreases) the speed of the robot 10 such that the power of the frequency component of the predetermined range Δf including the natural vibration frequency f of the robot 10 is equal to or less than a threshold Th, in the power spectrum distribution of the centrifugal force F. FIG. 5A is a schematic diagram showing the time series data of the centrifugal force F after the speed change (decrease), and FIG. 5B is a schematic diagram showing the power spectrum distribution of the centrifugal force F after the speed change (decrease). As shown in FIG. 5A, when the speed is decreased, the centrifugal force F generated in the arc portion decreases and time in which the robot 10 passes the arc portion becomes long. As a result, as shown in FIG. 5B, the power spectrum distribution entirely shifts to a low frequency side, and the power of the frequency component corresponding to the predetermined range Δf including the natural vibration frequency f of the robot 10 decreases to equal or less than the threshold Th.

The threshold Th is an upper limit value of the power of the frequency component in the predetermined range Δf including the natural vibration frequency f of the robot 10, for satisfying a movement path accuracy of the arm tip end portion 12 (tool T) of the robot 10 with desired path accuracy. The upper limit value of the power satisfying the predetermined path accuracy may be obtained by a test for operating the robot 10 in advance on the basis of the operation program, or may be obtained by calculation.

The storage unit 25 stores the operation program (path data, speed command (constant speed), or the like) and the teaching data that are described above. The storage unit 25 stores the threshold Th described above. The storage unit 25 stores the natural vibration frequency f of the robot 10 and the predetermined range Δf thereof. The natural vibration frequency f and the predetermined range Δf thereof may be an actual measured value actually measured by operating the robot 10 in advance on the basis of the operation program, or may be a calculated value obtained by calculation. The calculated value (theoretical value) may be calculated by the following formula based on a spring constant Kc of each articulation of the robot 10, and an inertial moment J1 of the arm according to the posture of the arm, for example.

$$f = (1/2\pi) * \sqrt{(Kc/J1)} \quad (2)$$

The storage unit 25 is a rewritable memory such as an EEPROM.

The robot controller 20 includes, for example, an calculation processor such as a digital signal processor (DSP), or a field-programmable gate array (FPGA). Each of various functions of the robot controller 20 is realized by executing predetermined software (program) stored in the storage unit, for example. Each of various functions of the robot controller 20 may be realized by cooperation of hardware and software, or may be realized only by hardware (electronic circuit).

Figure 6:
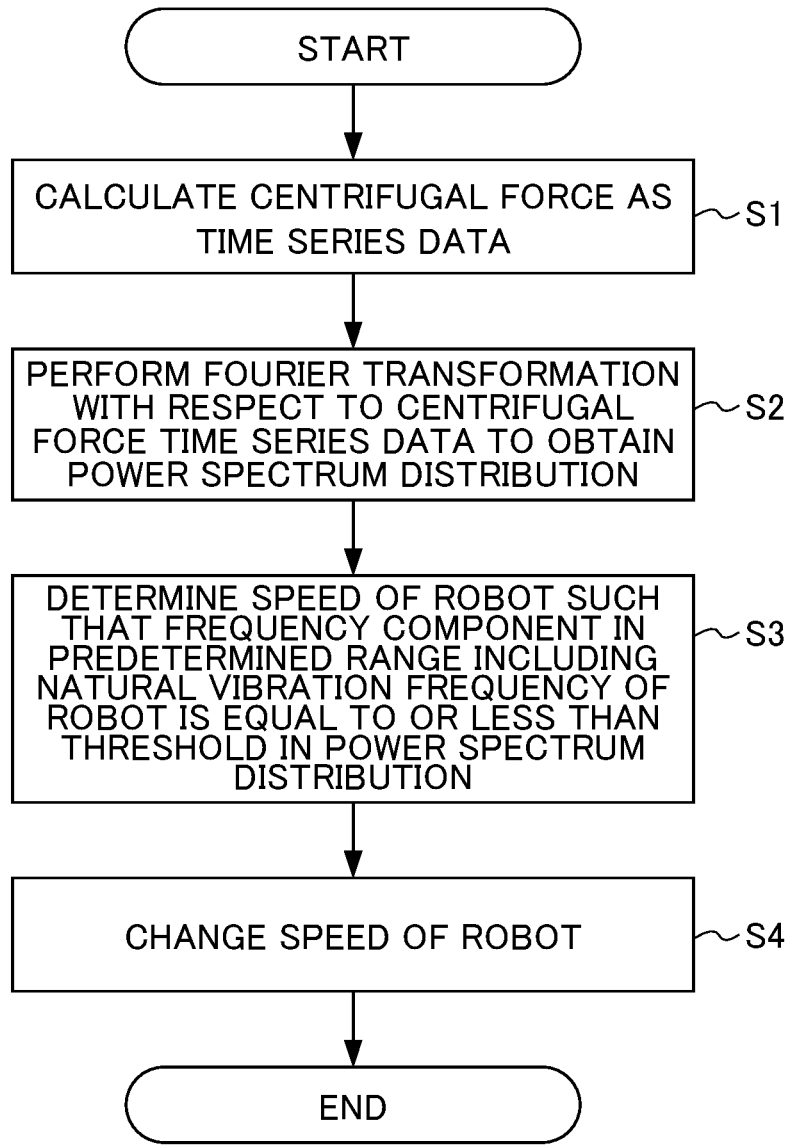
FIG. 6 is a flowchart of vibration suppressing operation of a robot by a robot controller according to the embodiment.

Next, vibration suppressing operation of the robot 10 by the robot controller 20 according to the present embodiment will be described. FIG. 6 is a flowchart of the vibration suppressing operation of the robot 10 by the robot controller 20 according to the present embodiment. First, as shown in FIG. 4A, the centrifugal force calculation unit 22 calculates the centrifugal force F acting on the arm tip end portion 12 of the robot 10 as the time series data (S1). Next, as shown in FIG. 4B, the Fourier transformation unit 23 performs Fourier transformation with respect to the time series data of the centrifugal force F obtained by calculation by the centrifugal force calculation unit 22 to obtain a power spectrum distribution (frequency data) (32). Next, as shown in FIG. 5A and FIG. 5B, the speed determination unit 24 determines the speed of the robot 10 such that the power of the frequency component in the predetermined range Δf including the natural vibration frequency f of the robot 10 is equal or less than the threshold Th, in the power spectrum distribution of the centrifugal force F (S3). Next, the servo control unit 21 changes (decreases) the speed of robot 10 on the basis of the determined speed (S4).

As described above, with the robot controller 20 according to the present embodiment, the centrifugal force calculation unit 22 calculates the centrifugal force F acting on the arm tip end portion 12 (tool T) of the robot 10 as the time series data, the Fourier transformation unit 23 performs Fourier transformation with respect to the time series data of the centrifugal force F to obtain the power spectrum distribution, and the speed determination unit 24 determines the speed such that the frequency component in the predetermined range Δf including the natural vibration frequency f of the robot 10 is equal or less than the threshold Th, on the basis of the power spectrum distribution of the centrifugal force F. As a result, it is possible to achieve the maximum speed that can be performed, under the control condition of tracing an arbitrary path while satisfying predetermined path accuracy. Thus, due to the centrifugal force F generated when the robot 10 passes the arc portion of the movement path, after the robot passes the arc portion, both suppressing of vibration in the vicinity of the natural vibration frequency f of the robot 10 excited in the arm tip end portion 12 of the robot 10 and increasing of speed of the robot 10 can be achieved.

The embodiment of the present invention has been described above. However, the present invention is not limited to the embodiment described above, and various changes and modifications can be performed. For example, in the embodiment described above, the speed determination unit 24 decreases the speed of the robot 10 such that the power of the frequency component in the predetermined range Δf including the natural vibration frequency f of the robot 10 is equal or less than the threshold Th, in the power spectrum distribution of the centrifugal force F shown in FIG. 4B. However, the speed determination unit 24 is not limited thereto, and may increase the speed of the robot 10. In this case, the speed of the robot 10 may be increased such that the frequency component in the predetermined range Δf including the natural vibration frequency f of the robot 10 is positioned in a valley portion in the power spectrum distribution of the centrifugal force F.

In the embodiment described above, exemplified is the robot system 1 in which the workpiece W is fixed and installed, and the tool T is attached to the arm tip end portion 12 of the robot 10 so that the tool T is moved relatively to the workpiece W. However, the feature of the present invention is not limited thereto, and can be applied to a robot system in which a tool is fixed and installed, and a workpiece is held in an arm tip end portion of a robot, so that the tool is moved relatively to the workpiece.

In the embodiment described above, a robot system for sealing processing has been exemplified. However, the feature of the present invention is not limited thereto, and can be applied to robot control in various robot systems that move an arm tip end portion of a robot at constant speed (high speed) on the basis of a movement path including an arc portion.

EXPLANATION OF REFERENCE NUMERALS

1 Robot system
10 Robot
12 Arm tip end portion
14 Servo motor
16 Encoder
20 Robot controller
21 Servo control unit
22 Centrifugal force calculation unit
23 Fourier transformation unit
24 Speed determination unit
25 Storage unit
T Tool
W Workpiece

What is claimed is:

1. A robot controller that controls an arm tip end portion of a robot to move at constant predetermined speed on the basis of a movement, path including an arc portion, the robot controller comprising:
   a centrifugal force calculation unit that calculates a centrifugal force acting on the arm tip end portion as time series data;
   a transformation unit that performs Fourier transformation with respect to the time series data of the centrifugal force into frequency data; and
   a speed determination unit that determines the predetermined speed such that a frequency component in a predetermined range including a natural vibration frequency of the robot is equal to or less than a threshold on the basis of the frequency data of the centrifugal force.

2. The robot controller according to claim 1, wherein the threshold is an upper limit value of the frequency component in the predetermined range including the natural vibration frequency of the robot, for satisfying a movement path accuracy of the arm tip end portion with desired path accuracy.

3. The robot controller according to claim 1, wherein the predetermined range including the natural vibration frequency of the robot is a variation range of the natural vibration frequency that varies according to a posture of the robot.

4. The robot controller according to claim 1, wherein the centrifugal force calculation unit calculates the centrifugal force on the basis of speed, acceleration, or angular speed of the arm tip end portion, a mass of the arm tip end portion, and a curvature radius of the arc portion of the movement path.

* * * * *